(12) United States Patent
Lucas

(10) Patent No.: US 11,840,179 B2
(45) Date of Patent: Dec. 12, 2023

(54) CAMERA/LENS MOUNTING PLATFORM FOR VEHICLE

(71) Applicant: William J. Lucas, Littleton, CO (US)

(72) Inventor: William J. Lucas, Littleton, CO (US)

( * ) Notice: Subject to any disclaimer, the term of this patent is extended or adjusted under 35 U.S.C. 154(b) by 30 days.

(21) Appl. No.: 17/877,900

(22) Filed: Jul. 30, 2022

(65) Prior Publication Data

US 2023/0045970 A1 Feb. 16, 2023

Related U.S. Application Data

(60) Provisional application No. 63/233,521, filed on Aug. 16, 2021.

(51) Int. Cl.
*B60R 11/04* (2006.01)
*B60R 11/00* (2006.01)

(52) U.S. Cl.
CPC ......... *B60R 11/04* (2013.01); *B60R 2011/004* (2013.01); *B60R 2011/008* (2013.01); *B60R 2011/0071* (2013.01)

(58) Field of Classification Search
CPC ... G03B 17/56; B60R 11/04; B60R 2011/004; B60R 2011/0071; B60R 2011/008; B60R 2011/005; B60R 2011/0003; B60R 2011/0021
USPC .......... 248/208, 689, 674, 675, 201, 220.21, 248/220.22, 221.11, 222.13, 223.41, 248/225.11, 231.9, 274.1, 276.1, 282.1, 248/285.1, 286.1, 287.1, 298.1, 499, 500, 248/503, 505; 362/382, 390, 396; 396/52, 55, 419, 427, 428
See application file for complete search history.

(56) References Cited

U.S. PATENT DOCUMENTS

| 2,614,471 | A | * | 10/1952 | Markowitz | .......... | G03B 15/041 248/214 |
| 3,055,283 | A | * | 9/1962 | Suzuki | .................... | G03B 17/48 396/432 |
| 3,752,376 | A | * | 8/1973 | Shelton | .................... | B60R 11/04 396/428 |
| 3,833,196 | A | * | 9/1974 | Protzman | ............. | G03B 17/561 396/428 |
| 4,029,246 | A | * | 6/1977 | Woodruff | ............. | F16M 11/048 396/428 |
| 4,615,597 | A | * | 10/1986 | Burriss | ................ | F16M 11/048 396/428 |
| 4,933,691 | A | * | 6/1990 | Leslie | ..................... | B60R 11/04 396/428 |
| 5,055,864 | A | * | 10/1991 | Slikkers | ............... | F16M 13/022 396/428 |
| 5,260,731 | A | * | 11/1993 | Baker, Jr. | ............. | F16M 13/022 396/428 |
| 5,755,411 | A | * | 5/1998 | Strong, III | ............. | B60N 3/007 248/118 |

(Continued)

*Primary Examiner* — Christopher Garft
*Assistant Examiner* — Michael McDuffie
(74) *Attorney, Agent, or Firm* — Leyendecker & Lemire LLC

(57) ABSTRACT

A Camera/lens mounting platform (also referred to hereafter as the "platform") for attachment to the window opening in a vehicle door is described. The platform is configurable to clamp to the doors of many, if not most, passenger cars and light duty trucks when a door's window is fully or nearly fully retracted. The platform offers a firm connection to the vehicle door and high stability to minimize blurring of photos and video.

20 Claims, 7 Drawing Sheets

(56) References Cited

U.S. PATENT DOCUMENTS

| | | | | |
|---|---|---|---|---|
| 6,019,326 | A * | 2/2000 | Baerwolf | F16M 11/048 |
| | | | | 396/432 |
| 6,474,615 | B1 * | 11/2002 | Simonen | F16M 11/10 |
| | | | | 396/428 |
| 8,267,364 | B2 * | 9/2012 | Church | F16M 11/10 |
| | | | | 248/230.1 |
| 9,604,580 | B2 * | 3/2017 | Boer | B64D 43/00 |
| 11,440,362 | B2 * | 9/2022 | Nicholson | F16B 2/065 |
| 2004/0114374 | A1 * | 6/2004 | Gaumont | F21V 21/0832 |
| | | | | 362/277 |
| 2011/0129210 | A1 * | 6/2011 | McGucken | G03B 17/561 |
| | | | | 705/26.5 |
| 2015/0286117 | A1 * | 10/2015 | Sung | F16M 11/041 |
| | | | | 248/220.22 |
| 2023/0070384 | A1 * | 3/2023 | Groce | H04N 5/77 |

* cited by examiner

CAMERA/LENS MOUNTING PLATFORM FOR VEHICLE

BACKGROUND

Photographing or taking video of objects, animals and people from a distance typically requires a camera lens with a high focal length. High focal lengths lenses, especially high quality lenses, are both long and heavy effectively requiring they be supported. Further, the stability of the lens when taking a photograph or video is critical in capturing a sharp image and/or smooth video under high magnification. This is often true even when the lens has a stabilization system built in to it.

In certain situations photographers are known to take photos or video from their vehicles through an open driver or passenger side window, such as when viewing wildlife from the side of a road. In these situations it is customary to use the bottom edge of the door window opening to stabilize the lens and an associated camera. To enhance the amount of stabilization offered by the vehicle door, photographers often use platforms. One common platform comprises a beanbag that conforms to the underlying edge of the door on its bottom and cradles the lens on its top.

There are also bracket-type platforms that attach the bottom edge of a door's window opening and attach directly or indirectly to a tripod mount of the lens or camera. These suffer several limitations: first the door clamping mechanism often cannot fully stabilize the camera and lens combination sometimes in part because of the shape of the door and the underlying flexibility of the portions of the door being clamped to; and second, the bracket-type platforms often raise the lens and camera very high in the window opening often making it difficult for photographers, particularly shorter one, to use the camera when seated in the adjacent car seat.

DETAILED DESCRIPTION

Figure 1:
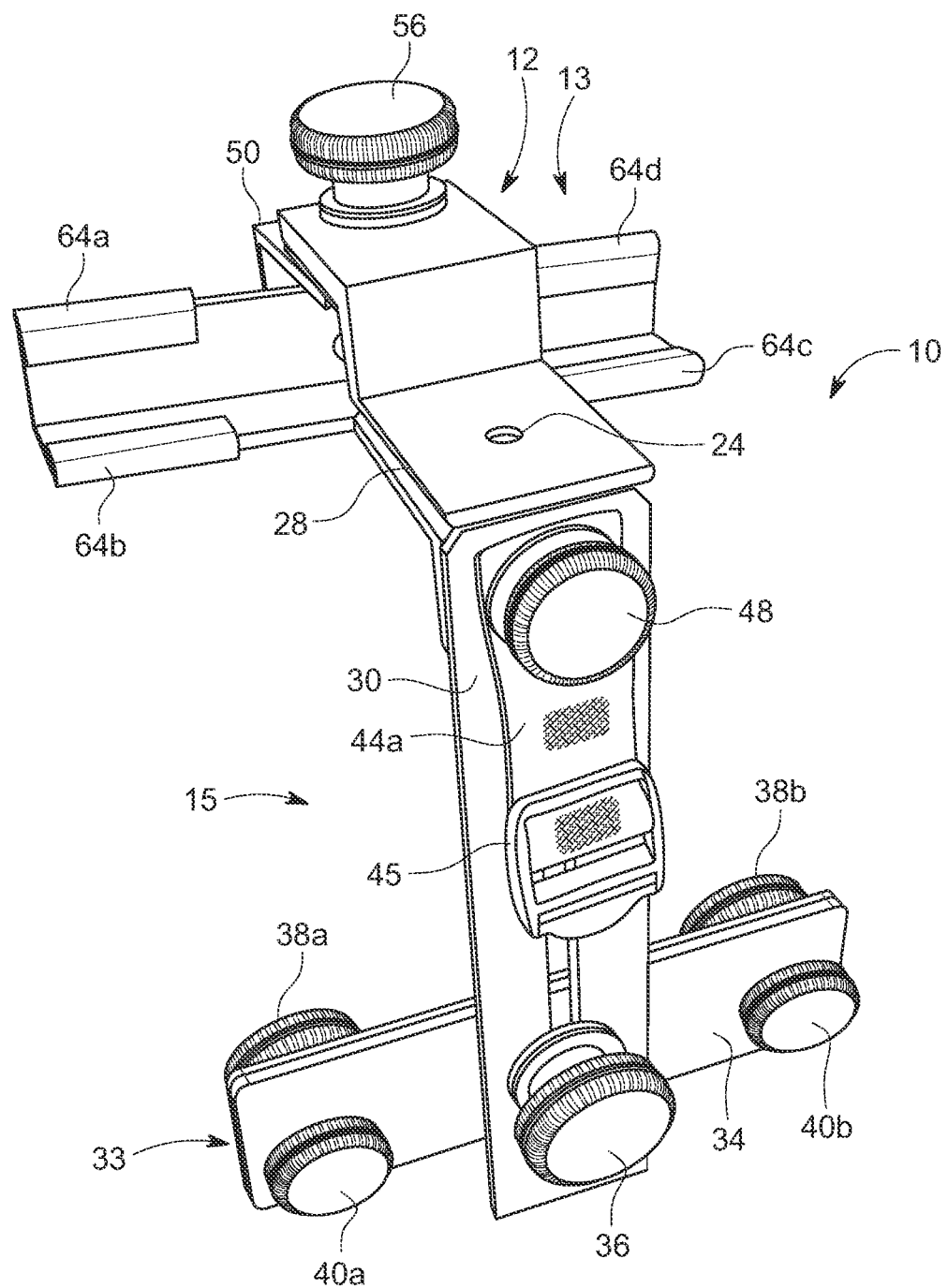
FIG. 1 is a perspective back (or inside) view of a camera lens/mounting platform according to an embodiment of the present invention.
Figure 2:
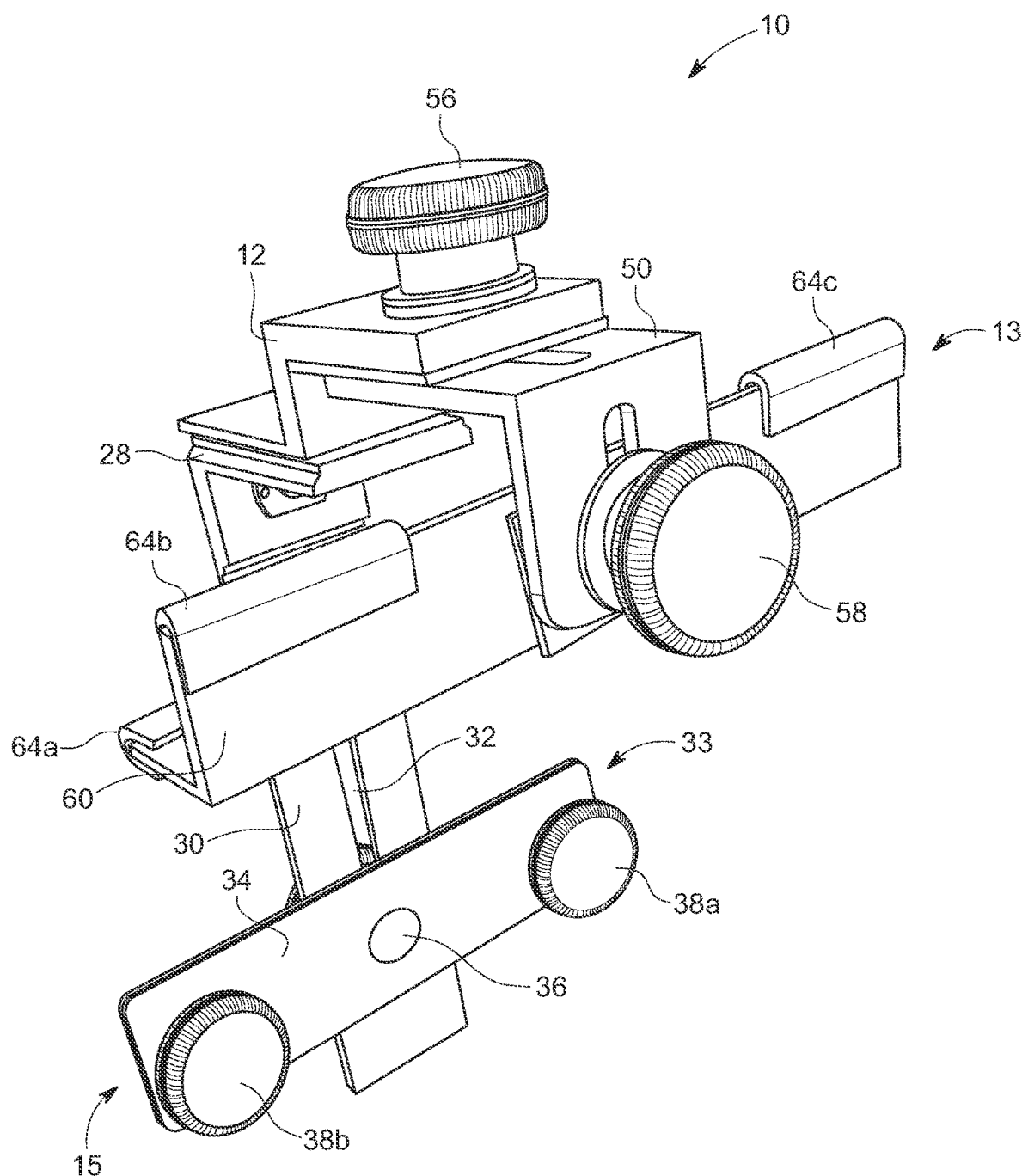
FIG. 2 is a perspective front (or outside) view of the camera lens/mounting platform according to an embodiment of the present invention.
Figure 3:
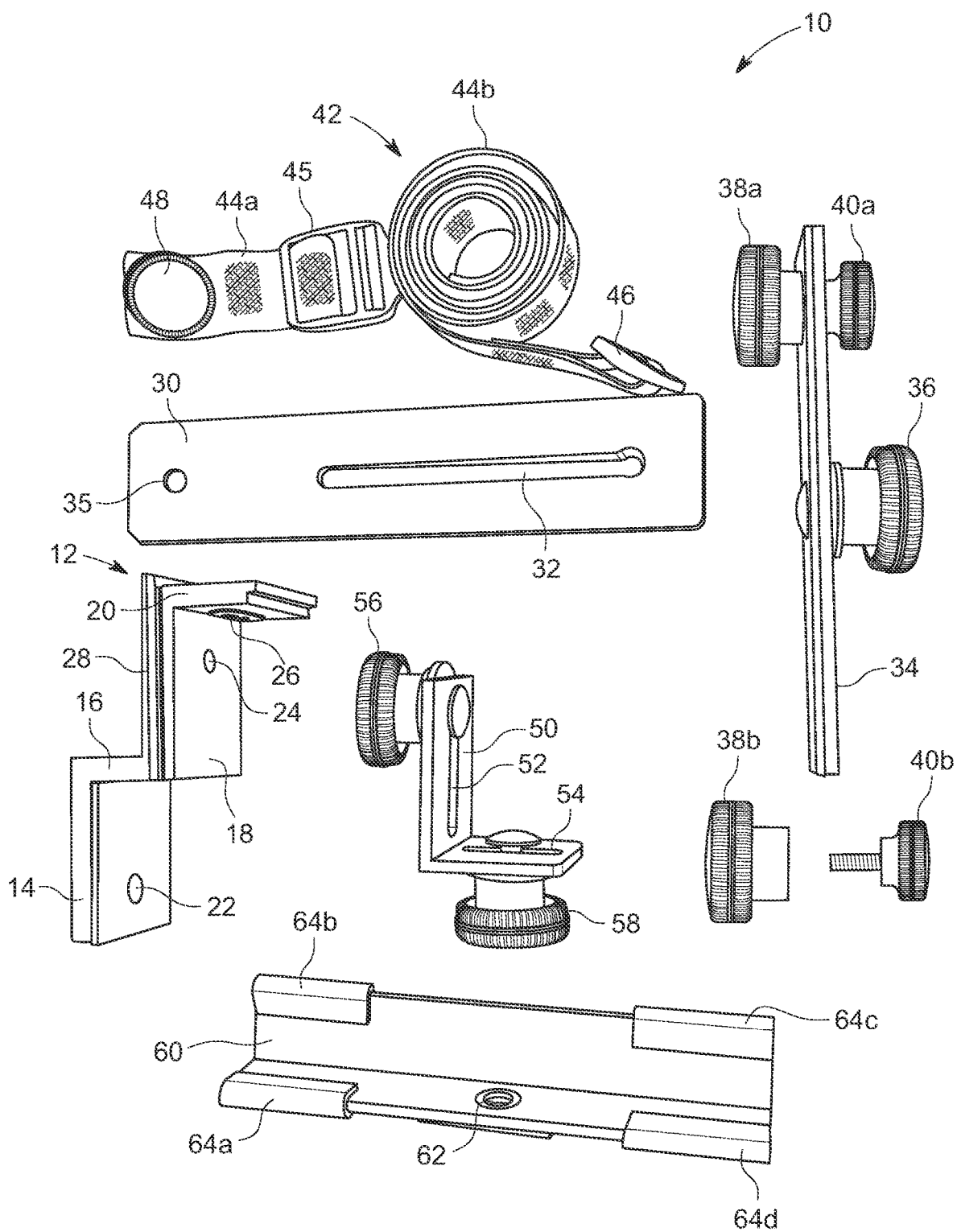
FIG. 3 is a exploded view of the camera lens/mounting platform according to an embodiment of the present invention.

Embodiments of present invention comprise the Camera/lens mounting platform (also referred to hereafter as the "platform") for attachment to the window opening in a vehicle door. The platform is configurable to clamp to the doors of many, if not most, passenger cars and light duty trucks when a door's window is fully or nearly fully retracted. The platform offers a firm connection to the vehicle door and high stability to minimize blurring of photos and video taken through a high magnification lens.

Embodiments of the present invention comprise a vehicle door window opening bracket-type platform that maximizes the stability of the mounted camera and lens system while also positioning the system relatively low in the window opening to facilitate greater ease of use. The platform is configured to clamp to the doors of many, if not most, passenger cars and light duty trucks when the window is fully or nearly fully retracted. The platform offers a firm connection to the vehicle and high stability to minimize blurring of photos and video taken through a high magnification lens.

Embodiments of the platform each typically comprise a Z-bracket that, in use, rests against the bottom edge of a vehicle door's window opening (with the window completely or substantially retracted). The camera/lens system with or without a gimbal attaches to the Z-bracket. The camera/lens mount often comprises opposing generally horizontally oriented V-shaped grooves that accept Arca-Swiss type quick release clamps. Variations may also include a bore that accepts a tripod type screw therethrough.

The platform further comprises a front bracing assembly that is adjustably secured to the front of the Z-bracket and a stabilizer assembly that is secured to the back of the Z-bracket. The front bracing assembly braces against the window trim along the outside of the window well opening of the vehicle door while the stabilizer assembly braces against an opposing interior door panel. When secured to the door in this manner, the platform provides substantially stable mounting location for a camera/lens system. The configuration of the various assemblies comprising the platform offer a high degree of adjustability and customizability that permit it to be securely attached to a wide number of vehicle doors of differing designs and configurations.

At least some embodiments further include a securing strap assembly that attaches at one end to one or both the Z-bracket and the stabilizer assembly. The strap assembly includes an elongated strap that is secured by way of a stop between the bottom edge of the vehicle door and the associated door sill to provide additional and redundant securement of the platform further inhibiting it from toppling out of the vehicle. As can be appreciated the effective length of the strap is adjustable to accommodate different vehicles.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "camera" as used herein refers to any type of camera whether for taking still photographs or video. A camera may include an integral lens or a separable lens may attach to the body of the camera.

As used herein the term "gimbal" refers to any device which is securely attachable to a base device, such as, but not limited to, the platform as described herein or a tripod, and to which a camera or camera/lens system can be securely attached wherein one or more of the angular position and rotational position of the camera can be varied without rotating or changing the angle of the base device.

An Embodiment of a Camera/Lens Mounting Platform

As shown in FIGS. 1-5, the illustrated embodiment of the platform 10 primarily comprises a Z-bracket 12, a front bracing assembly 13, and a stabilizer assembly 15. Additionally, the illustrated embodiment includes a securing strap assembly 42 that provides an additional and redundant mechanism for securing the platform, especially when a camera/lens system is mounted thereto, to hold platform in place on the door.

The Z-bracket 12 comprises a flat plate-like strip formed into three portions 14, 16 & 18 in a Z-like shape often including an additional downwardly extending tail or fourth portion 20. It, like the other brackets and plate-like pieces comprising the platform 10, typically comprises aluminum but can also be comprised of other suitable materials, such as other metals, reinforced plastics, and composite materials. The Z-bracket along with the other platform pieces can be fabricated by any suitable means. In one embodiment the Z-bracket is cast. In other embodiments, the bracket can be formed from a strip of metal bent into shape with additional features, such as bores and grooves formed in a secondary operation such as machining. Other variations can be fully machined from a block of material, such as an aluminum alloy. Reinforced plastic and composite variations can be molded using known techniques.

Starting from nominal front side of the bracket 12 and the platform 10, it comprises a generally horizontal extending first portion 14. A first bore 22 is provided through the first portion to which a threaded shaft of a first bracing clamp 56 can be received to adjustably secure a the front bracing assembly 13 thereto.

From back end of the first portion a second portion 16 extends downwardly therefrom. The second portion is substantially orthogonal to the first portion. The bottom end of the second portion, which also comprises the front end of the third portion 18, typically rests on the bottom edge of the window opening of the vehicle door 102 on a lip to the inside of the window well 104. The front side of the second portion is, like all surfaces of the platform 10 that can come into contact with the vehicle door, typically covered in soft compliant material, such as an elastomeric sheet. In some variations when in use, the door's window can be raised slightly until contacting and bracing against the front side of the second portion to provide an additional means of securement of the platform to the door.

The third portion 18 extends generally horizontally and substantially orthogonally from the intersection with the second portion 16. The third portion typically includes a generally vertically extending second bore 24 configured receive a tripod mount screw that can be used to attach a camera 202, a lens 204 or a gimbal 202 thereto. Further, the opposing left and right edges of the third portion include V-shaped grooves 28 formed therein that are adapted to receive Arca-Swiss type quick release clamps thereon.

In some variations, including the illustrated embodiment, the Z-bracket 10 includes a fourth portion 20 that interests with the back edge of the third portion 18 and extends generally downwardly and orthogonally therefrom. The length of the fourth portion can vary. In the illustrated version, however, the portion is relatively short and includes a third bore 26, which is often threaded, that is used to secure the stabilizer assembly 15 thereto using a first stabilizer clamp 48.

The illustrated stabilizing assembly 15 primarily comprises a generally vertically extending leg 30 and a generally horizontally extending stabilizer bracing assembly 33. The vertically extending leg 30 is typically an elongated plate-like member that can be fabricated from any suitable material but most often comprises an aluminum alloy. The shape of the vertically extending leg can vary as well. As shown, the vertically extending leg includes a leg bore 35 proximate a top end, and an elongated leg slot 32 that extends along a substantial portion of the vertically extending leg's length terminating proximate a bottom end of the vertically extending leg. The stabilizer subassembly 33 is adjustably secured to the vertically extending leg by way of a second stabilizer clamp 36.

As mentioned above, the vertically extending leg 30 is coupled to the fourth portion 20 by way of the first stabilizer clamp 48. The first stabilizer clamp comprises a bolt with a threaded shaft that is received through the leg bore and is threadably received in the second bore 24 of the Z-bracket. The head of the bolt typically comprises a knob that can be hand tightened to firmly secure a top portion of the vertically extending leg against and to the fourth portion 20 of the Z-bracket. The first stabilizer clamp can also include a washer.

As can be appreciated other types of clamps and other attachment mechanisms can be used to couple the vertically extending leg to the Z-bracket. Further the configuration of the clamping bolt comprising the first stabilizer clamp can vary as well. For instance variations wherein the knob-type head is replaced with a more tradition socket-type head or a hex head is known. In yet another variation the fourth portion 20 of the Z-bracket 12 is extended vertically essentially functioning as the vertically extending leg and obviating the need for a distinct vertically extending leg.

The stabilizer bracing assembly 33 comprises a generally horizontally extending elongated stabilizer member 34 with left and right ends having respective left and right stabilizer bores extending therethrough as well as a center stabilizer bore extending through it proximate a center location along its length. The stabilizer member is adjustably secured to the vertically extending leg by way of a second stabilizer clamp 36 that includes a bolt with a threaded shaft that is received through the center stabilizer bore and leg slot and is threadably secured tightening the connection with a internally threaded knob. As can be appreciated the second stabilizer clamp can also include a washer.

By loosening the knob of the second stabilizer clamp 36, the elongated stabilizer member can be slid upwardly and/or downwardly along the elongated leg slot 32 as well as rotated relative to the vertically extending leg 30. Accordingly, the stabilizer bracing assembly 15 can adjusted so that left and right stabilizer pads 38a & 38b respectively can be adjusted to make contact with an underlying interior door panel of a vehicle door 102.

The left and right stabilizer pads 38a & 38b are secured to the elongated stabilizer member 34 through the respective left and right stabilizer bores. As shown, each stabilizer pad comprises a knob that is internally threaded and adapted to receive a threaded shaft that is attached to a corresponding smaller and thinner stabilizer pad 40a & 40b. In use the larger pads and smaller pads can be flipped as desired to more securely seat the selected pad against the interior panel 105 of the vehicle door 102. The pads are substantially similar to knobs used elsewhere in the mounting platform and can be tightened or loosened as need be, such as after flipping them over. In at least one embodiment the smaller pads 40a & 40b are about 0.50" thick; whereas, the larger pads 38a & 38b are about 0.75" thick, although the thickness can vary for specific embodiments. The faces of the pads, which are typically comprised of a plastic, can be coated or covered with an elastomeric and/foam material to ensure the surfaces of the underlying door panel are not damaged or marked in use.

Figure 7:
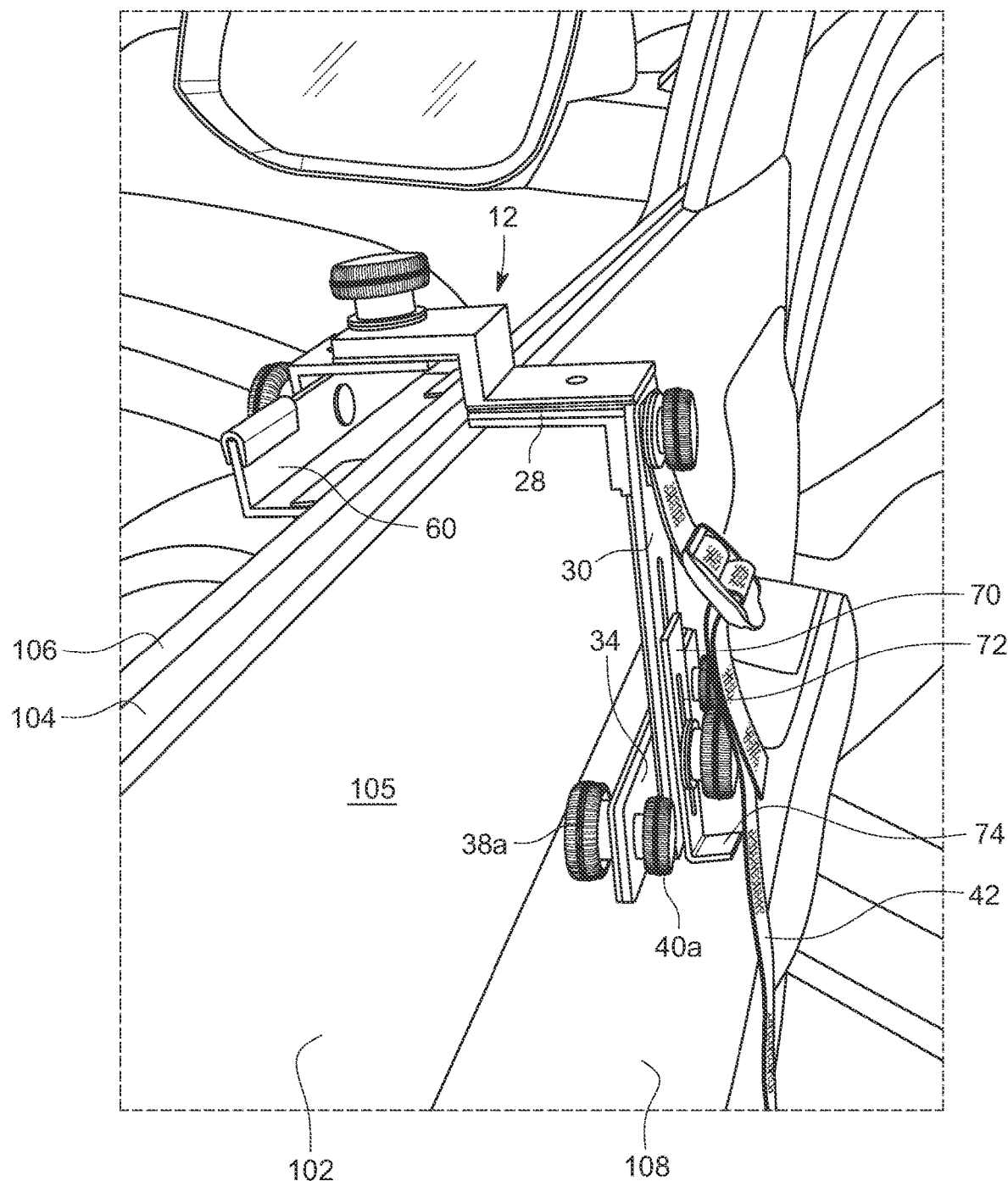
FIG. 7 is a perspective side view of the camera lens/mounting platform mounted to the vehicle door at a bottom edge of a window opening as viewed from the inside of the door with a stabilizer foot bracket resting against an arm rest of the vehicle door according to an embodiment of the present invention.

With reference to FIG. 7, an optional foot extension 70 can be used in certain configurations of the platform. The foot extension comprises a vertically-orientated elongated plate member having a foot extension slot 72 along a significant portion of its length and having a foot 74 at its distal end that extends outwardly at an angle, generally orthogonally, therefrom. The foot extension rest against the vertically extending leg 30 and is slidably secured thereto by the second stabilizer clamp 36 that extends through the foot extension slot. In use, the foot extension is adjusted to rest on an armrest 108 of the vehicle door. The foot extension can be used in place of the horizontally extending stabilizer subassembly 33, especially where the configuration of the door panel 105 prevents the pads from having secure contact therewith, or in addition to it. Typically, the foot is adjusted and tightened, such that it rests on and is braced against the arm rest on the door panel of the associated vehicle door. This provides additional stabilization of the platform.

The illustrated front bracing assembly 13 primarily comprises a bracing L-bracket 50 and a substantially horizontally extending trim bracket 60. The bracing L-brackets includes a generally horizontal first side with a lengthwise extending first side slot 52. A generally vertical second side extends orthogonally downwardly from an intersection with the first side and includes a lengthwise extending second side slot 54 therein. The first side rest against the bottom surface of the first portion 14 of the Z-bracket 12 with the L-bracket being secured to the Z-bracket 12 with a first bracing clamp 56. The first bracing clamp is generally similar to the second stabilizer clamp 36 comprising a bolt with a threaded shaft that is received through the first bore 22 in the first portion 14 and first side slot 52 and is threadably secured tightening the connection with a internally threaded knob that acts as a nut. As can be appreciated the second stabilizer clamp can also include a washer.

The trim bracket 60 is coupled to the vertical second side of the bracing L-bracket 50 by way of a second bracing clamp 58 that is substantially similar to the first bracing clamp in construction. The threaded shaft of the second bracing clamp is received through the second side slot 54 and a centralized bore 62 on a vertical side of the trim bracket. The illustrated version of the trim bracket comprises an elongated L-channel having the vertical side and a horizontal side with each side having a width of about one inch in at least one embodiment. The elongated edges of the sides are each covered with one or more soft plastic or elastomeric bumpers 64a-d. In use, one elongated edge is clamped against the trim 106 along the outside of a door's window well 104. The bumpers help protect the trim from being marred or damaged by the hard edge of the trim bracket. As can be appreciated the trim bracket can be flipped over relative to the bracing L-bracket such that the other of the elongated edges makes contact with the trim allowing further adjustment when fitting the platform 10 to a vehicle door.

To increase the friction between the connection between Z-bracket 12 and the bracing L-bracket 50, as well as the connection between the bracing L-bracket and the trim bracket 60, the respective interfaces thereof can each include a piece of friction inducing material, such as a thin piece of rubber or foam, placed between the bracket interfaces to help inhibit the sliding and rotational movement of the brackets relative to each other once the respective clamps have been tightened. In some variations the respective interfaces may include a friction inducing coating in lieu of a layer of foam material. Of note, most of the inside surface of vertically extending leg 30 of the stabilizing assembly 15 is either covered in or coated with a foam or soft material since the vertically extending leg may come into direct contact with the door's interior panel during use. This material also functions as a friction inducing material at the interface with the elongated stabilizer member 35 of the stabilizer subassembly 33.

The various clamps, and associated slots provided for the various components of the platform 10 permit the platform to be adjusted to fit on a wide variety of vehicle doors. Preferably, the platform is adjusted so that both inwardly disposed pads 38*a*&*b* and 40*a*&*b* of the stabilizer assembly 15 are firmly in contact with the interior panel 105 of the vehicle's door 102 while the bracing trim bracket 60 is firmly and securely braced up against the trim 106 of the window well 104, and the bottom edge of the second portion 16 of the Z-bracket 12 is resting on the inside edge of the window well. The positions of the various components can be adjusted by loosening the various clamps and moving the components along associated slots and rotating the angular position of the components about the axis of an associated clamps. Once the desired positioning is achieved the various clamps are tightened by turning the associated knobs. The weight of the camera/lens and gimbal combination when attached to the platform acts through the third portion 18 of the Z-bracket 12 to shift the center of gravity toward the interior of the vehicle away from the door 102 thereby pulling the bracing trim bracket 60 more firmly against the trim 106 while also pushing the pads more firmly against the interior panel 105. The result is a particularly stable connection as is desired and necessary when taking pictures or recording video through high focal length lenses.

Figure 6:
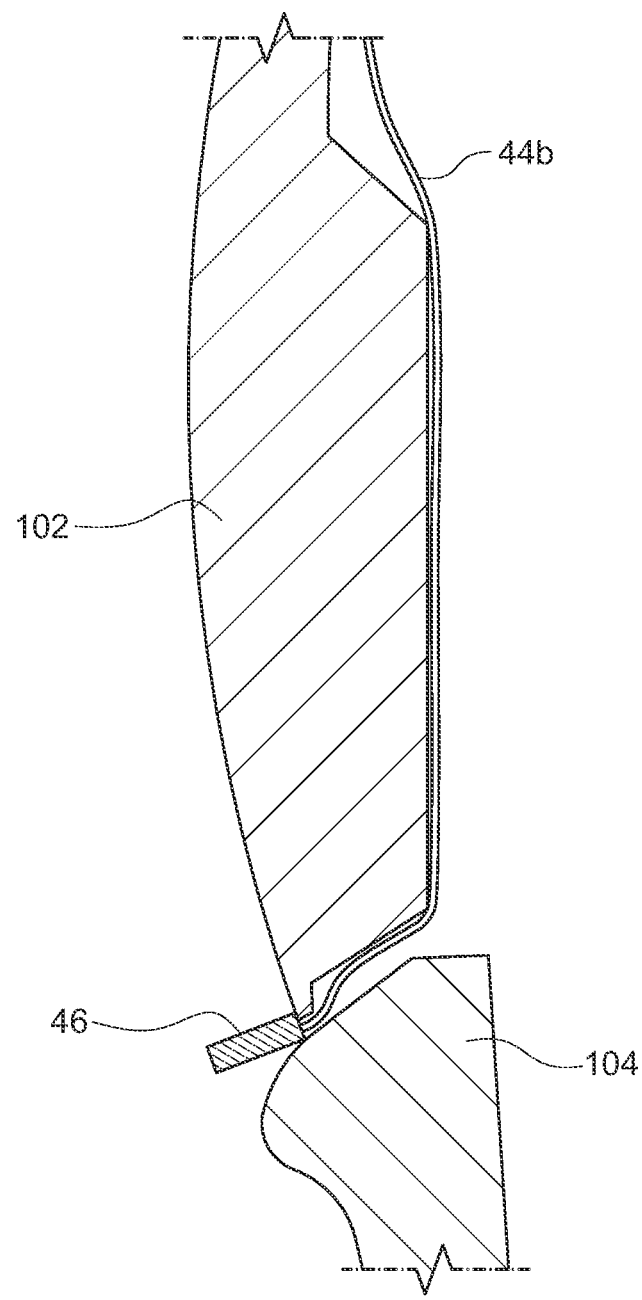
FIG. 6 is a partial cross section of a vehicle door and the vehicle's door sill showing the a securing strap of the mounting platform secured between the bottom of the door and top of the sill according to an embodiment of the present invention.

As an additional means of securing the platform to the vehicle door, a securing strap assembly 42 is also typically utilized. The assembly comprises a relatively short first strap portion 44*a* that is typically attached to the rest of the platform at the first stabilizing clamp 48 wherein a proximal end, which includes a hole therethrough to receive the shaft of the clamp, and is sandwiched between a washer and the outer surface of the vertically extending leg 30. The distal end of the first strap portion terminates with a connection to a strap adjustment buckle 45. The proximal end of the longer second strap portion 44*b* is threaded through the strap adjustment buckle allowing the effective adjustment of its operative length. The distal end of the second strap portion includes a stop or wedge 46 that is designed to wedge against the outside of the interface between the bottom the vehicle door 102 and the door sill 104 as shown in FIG. 6.

Operationally, the strap assembly 42 when tightened in place provides a redundant mechanism for securing the platform 10 to the door 102. Essentially, it acts in a manner similar to the weight of the camera/lens system and gimbal combination by pulling the bracing trim bracket 60 more firmly against the trim and encouraging the pads 38*a*&*b* or 40*a*&*b* against the door panel 105. It also helps to prevent a situation wherein the user of a camera/lens system mounted to the platform accidentally knocks the combination causing it to tumble outwardly and off of the door potentially causing damage thereto.

A Method of Securing the Platform to a Vehicle Door and Securing a Camera/Lens System and Gimbal Combination to the Platform.

Figure 4:
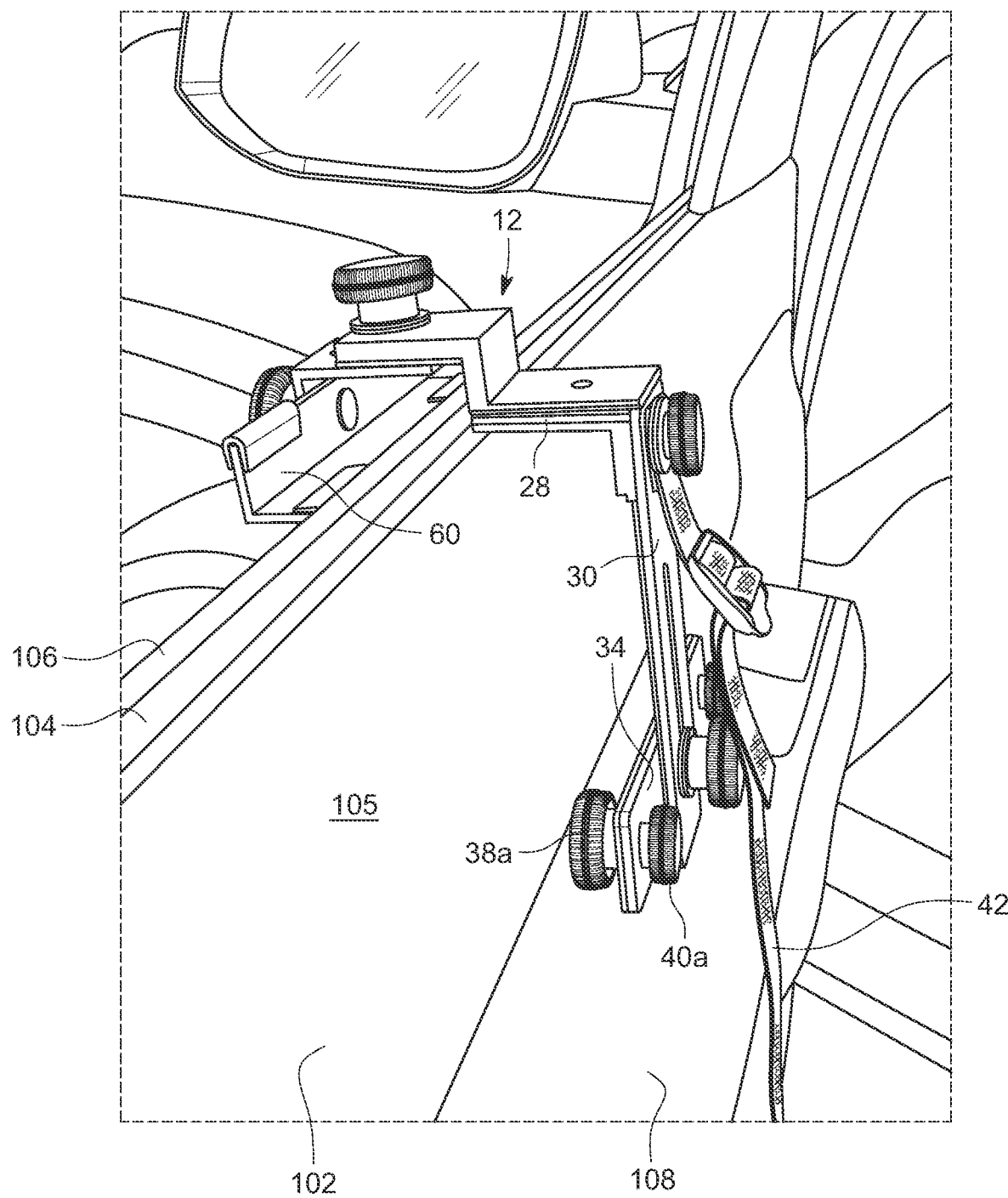
FIG. 4 is a perspective side view of the camera lens/mounting platform mounted to the vehicle door at a bottom edge of a window opening as viewed from the inside of the door according to an embodiment of the present invention.
Figure 5:
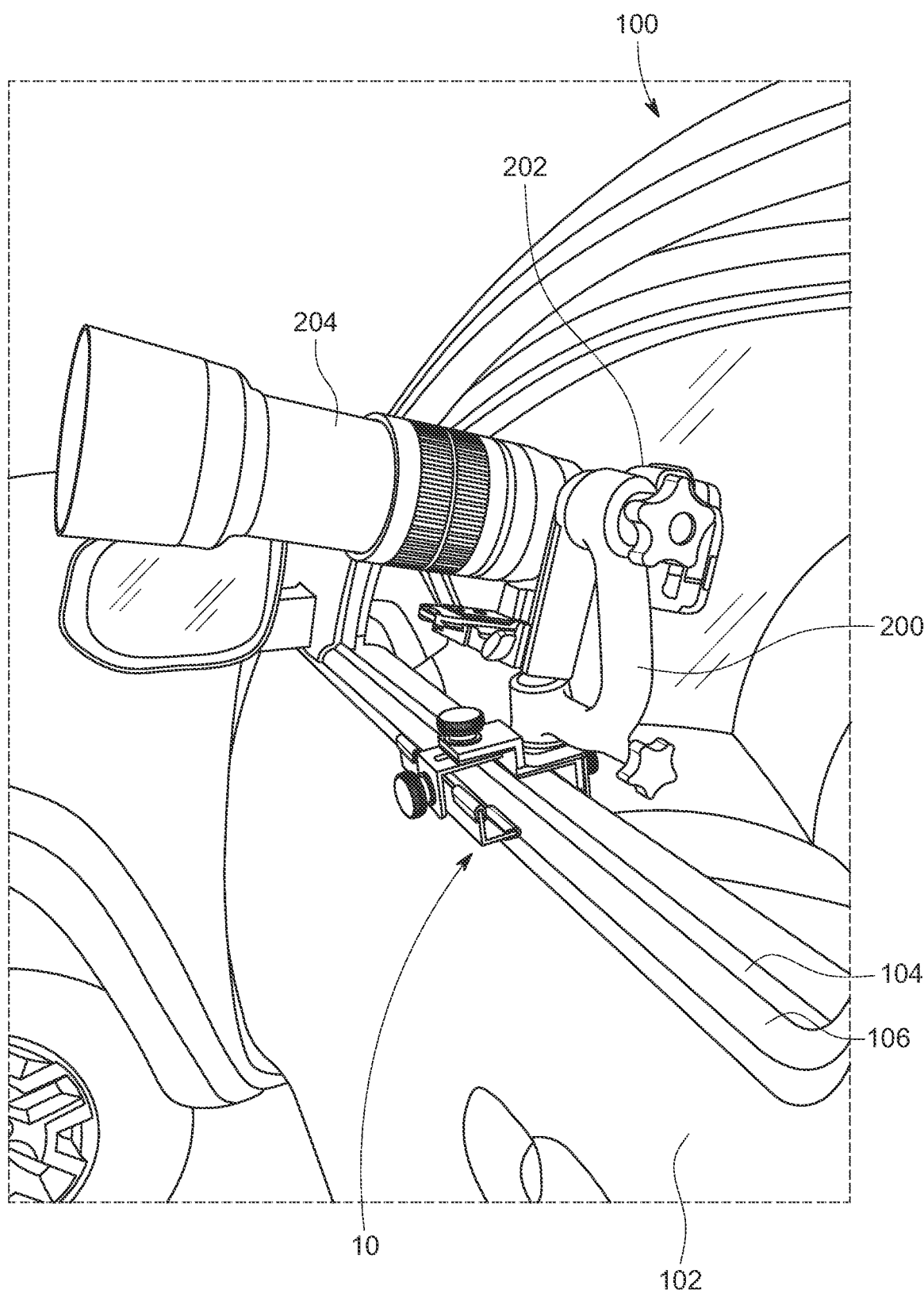
FIG. 5 is a perspective outside view of the camera lens/mounting platform mounted to the vehicle door at a bottom edge of a window opening as viewed from the outside of the door with a gimbal having a camera and lens attached to it being secured to the mounting platform according to an embodiment of the present invention.

The setup and mounting of the platform 10 to a vehicle door is described with reference to FIGS. 1-6 and particular reference to FIGS. 4 & 5. The order of operations described herein can vary and need not be carried out in the specific sequence presented.

Initially, the user typically loosens the various clamps sufficiently so that the various brackets and components can be adjusted relative to each other, such as moving one bracket member along a slot in an adjacent bracket member. The user than rests the platform with the bottom edge of the second portion 16 of the Z-bracket 12 on the edge of on the inside bottom edge of the vehicle door window opening adjacent the window well 104.

The bracing assembly 13 is then adjusted so that the inside edge of the trim bracket 60 rests firmly against the window trim 106 to the outside of the window well 104. The is accomplished by horizontally sliding bracing L-bracket 50 along the first portion 14 of the Z-bracket 12 and/or vertically sliding the trim bracket upwardly or downwardly relative to the bracing L-bracket. Further, the angular position of the brackets can be adjusted relative to each other with the goal of having the trim bracket contact the trim over as much of the edge of the trim bracket as is possible, and ensuring substantially the entirety of the bottom edge of the second portion 16 is resting on the inside edge of the window opening. Once the Z-bracket 12 and trim brace are positioned as desired, the first and second bracing clamps 56 & 58 are provisionally tightened.

Next, the user adjusts the stabilizer assembly 15. The second stabilizer brace clamp 36 is loosened allowing the horizontally extending elongated stabilizer member 34 to be moved up and down and rotated to find a location on the surface of the door panel 105 in which the pads 38*a*&*b* or 40*a*&*b* are in firm contact with the panel with the extension leg 30 being as close to vertical as possible. As necessary, one or both of the large pads 38*a*&*b* can be substituted for the small pads 40*a*&*b* to effect the best contact. Once the best location is ascertained, the clamp can be provisionally tightened.

After the platform has been provisionally fitted, the user can, as necessary, loosen one or more of the various clamps to make fine adjustments to its positioning on the vehicle door 102. Once the user is satisfied with the positioning, the various clamps can be firmly tightened to secure the platform's configuration.

The strap assembly 42 is secured between the bottom of the door 102 and the vehicle sill 104 when the door is closed. Simply, the second strap portion 44*b* is loosened at the adjustment buckle 45 to provide sufficient length. The wedge 46 at the distal end is positioned outside of the door resting on the sill, and the door is closed. The second strap portion is tightened through the adjustment buckle until taut.

Although not typically necessary, a user can raise door's window slightly on which the platform 10 is mounted to further secure the platform in place atop the bottom edge of the window opening. Vehicle door windows are typically canted a few degrees inwardly off of vertical, and as such, when the window is raised it also moves slightly towards the interior of the associated vehicle. Accordingly, if the window is raised sightly (typically less than an inch) its top impacts the front surface of the second portion 16 of the Z-bracket pushing the platform to toward the vehicle's interior and further tightening the connection between the trim bracket 60 and the window trim 106. As can be appreciated the front surface of the second portion is covered in a layer of foam to inhibit damage to the window.

After the platform 10 has been installed on the door 102, a gimbal 200 is typically attached to the platform. The gimbal provides multiple degrees of freedom in adjustment permitting a user to freely adjust a camera/lens system 202 & 204 that is attached thereto. It is to be appreciated that the camera/lens system can be attached directly to the platform 10 as well, but that such a configuration would not typically afford the user much freedom in aiming the camera. Most often, the gimbal is attached to the third portion 18 of the Z-bracket 12 using a Arca-Swiss type quick release clamps that attach to and interface with the opposing V-shaped grooves 28. Alternatively, the gimbal can be attached to the third portion using a tripod screw mount through the second bore 24.

Once the camera/lens system 202 & 204 is connected to the secured platform 10, the user can take photographs or videos as desired. The combination of the platform, gimbal and camera/lens offer a high degree of stability, but because the platform does not extend substantially above the bottom of the window opening, the camera/lens system tends to be centered within the vehicle door's window opening allowing an average user to remain comfortably seated in the adjacent car seat while operating the camera.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For instance the materials and configuration of the various components can vary substantially while still performing the same task. In one variation the vertically extending leg can be integrated with the fourth portion of the Z-bracket. The type of clamps used to hold the various brackets together can be different from the type illustrated herein. The foam layer lining the surfaces that do or can come into contact with door surfaces can be replaced with elastomeric or other soft plastic coatings. The configuration of the pads of the stabilizer assembly can vary in shape, size and configuration, and may be secured to the stabilizer assembly in a completely different manner. The mounting location and configuration of the strap assembly can vary as well.

The use of the platform has been described and illustrated primarily for use with photographic cameras, but it can be used with video cameras as well. Further, it can be used to mount other devices, such as spotting scopes and telescopes or even a rifle.

I claim:

1. A camera and/or lens mounting platform for use in a window opening of a vehicle door when the window is substantially retracted, the mounting platform comprising:
    a Z-bracket with a substantially horizontal first portion, a substantially vertical second portion extending downwardly and substantially orthogonally from the first portion at a proximal end of the first portion, and a substantially horizontal third portion extending outwardly and substantially orthogonally from the second portion at a bottom portion of the second end, the third portion including opposing grooves in left and right third portion edges;
    a bracing assembly adjustably connected to a front of the Z-bracket, the front bracing assembly being configured to brace against a trim lip on a vehicle door adjacent a window well; and
    a stabilizer assembly appending from a rear of the Z-bracket opposite the bracing assembly, the stabilizing assembly being configured to firmly rest against an inside surface of the vehicle door.

2. The mounting platform of claim 1, further including a securing strap assembly, an end of the securing strap being coupled to at least one of the Z-bracket and the stabilizer assembly.

3. The mounting platform of claim 1, wherein the stabilizer assembly comprises:
    a generally vertically extending leg adjustably coupled to the Z-bracket; and
    a generally horizontally extending stabilizer subassembly adjustably coupled to the vertically extending leg.

4. The mounting platform of claim 3, wherein the stabilizer assembly further comprises a foot brace comprising vertically extending portion having a foot extending outwardly therefrom at a distal end, the foot brace being adjustably coupled to the vertically extending leg.

5. The mounting platform of claim 3, wherein the vertically extending leg includes an generally vertically extending elongated stabilizer slot with the horizontally extending stabilizer subassembly being slidably coupled to the vertically extending leg by way of a second stabilizer clamp comprising a bolt with a threaded shaft passing through the stabilizer slot and a knob with internal threading receiving an end of the threaded shaft.

6. The mounting platform of claim 5, wherein the horizontally extending stabilizer subassembly includes (i) an elongated stabilizer member with left and right ends, (ii) a left stabilizer pad extending generally orthogonally outwardly from the elongated stabilizer member proximate the left end, and (iii) a right stabilizer pad extending generally orthogonally outwardly from the elongated stabilizer member proximate the right end.

7. The mounting platform of claim 6, wherein the left and right stabilizer pads each comprise a first knob having a first thickness threadably coupled to a second knob having a second thickness through a respective left or right bore in the elongated stabilizer member, the first thickness being less than the second thickness.

8. The mounting system of claim 1, wherein the Z-bracket further comprises a substantially vertical fourth portion extending downwardly and orthogonally from the third portion at a proximal end of the third portion.

9. The mounting platform of claim 8 wherein the elongated fourth portion includes an elongated generally vertically extending slot with the stabilizer assembly being slidably coupled to the vertically extending leg by way of a first stabilizer clamp comprising a bolt with a threaded shaft passing through the slot and a knob with internal threading receiving an end of the threaded shaft, the stabilizer assembling including i) a generally horizontally extending elongated stabilizer member with left and right ends, (ii) a left stabilizer pad extending generally orthogonally outwardly from the elongated stabilizer member proximate the left end, and (iii) a right stabilizer pad extending generally orthogonally outwardly from the elongated stabilizer member proximate the right end.

10. The mounting platform of claim 3, wherein the Z-bracket further comprises a substantially vertical fourth portion extending downwardly and orthogonally from the third portion at a proximal end of the third portion wherein the generally vertically extending leg is adjustably coupled to the fourth portion by way of a first stabilizer clamp.

11. The mounting platform of claim 10, wherein the first stabilizer clamp comprises a bolt with a threaded shaft that passes through both a leg bore in vertically extending leg and a threaded fourth portion bore in the fourth portion, an end of the bolt comprising a knob.

12. The mounting platform of claim 10 further comprising a securing strap assembly with first and second securing strap ends, a first securing strap end being secured to the mounting system at the first stabilizer clamp, and the second securing strap end being configured for securing receipt between a bottom of the vehicle door and a sill of the vehicle when the vehicle door is closed.

13. The mounting platform of claim 1, wherein the bracing assembly comprises:
    a bracing L bracket, the bracing L-bracket including a generally horizontal first L side including a longitudinally extending first side slot, and a generally vertical second L side including a longitudinally extending second side slot, the bracing L bracket being slidably coupled to the first portion through the first slide slot by way of a first bracing clamp; and a substantially horizontally-extending trim bracket, the trim bracket being slidably coupled to the bracing L bracket through the second slide slot by way of a second bracing clamp, wherein an edge of the trim bracket is configured to brace against the trim lip when installed on the vehicle.

14. The mounting platform of claim 13, wherein the first bracing clamp including a bolt with a threaded shaft passing through the first side slot and a knob with internal threading receiving an end of the threaded shaft.

15. The mounting platform of claim 13, wherein the second bracing clamp including a bolt with a threaded shaft passing through the slot and a knob with internal threading receiving an end of the threaded shaft.

16. The mounting platform of claim 12, wherein the trim bracket comprises L-channel, and is configured to be flipped around as necessarily to adjust fit on the vehicle door.

17. The mounting platform of claim 1 in combination with the vehicle, the mounting platform being mounted on the vehicle door.

18. The mounting platform of claim 1 in combination with the vehicle, a gimbal, a lens, and a camera, the mounting platform being mounted on the vehicle door, the gimbal being mounted to the mounting platform at the opposing grooves, the lens being attached to the camera, and one of the camera and lens being mounted to the gimbal.

19. A method of mounting the mounting platform of claim 1 on the vehicle, the method comprising:
lowering the window the vehicle window until fully retracted into the window well;
placing the Z-bracket on top of the window well;
adjusting the front bracing assembly and the stabilizer assembly until the front bracing assembly is flush against the trim lip and the stabilizer assembly rest firmly against the inside of the vehicle door;
attaching the gimble to the Z-bracket;
attaching the camera and lens combination to the gimble; and
taking photos and/or video with the camera.

20. A camera and/or lens mounting platform for use in a window opening of a vehicle door when the window is substantially retracted, the mounting platform comprising:
a Z-bracket with a substantially horizontal first portion, a substantially vertical second portion extending downwardly and substantially orthogonally the first portion at a proximal end of the first portion, and a substantially horizontal third portion extending outwardly and orthogonally from the second portion at a bottom portion of the second end, the third portion including an opposing groove connector, and a substantially vertical fourth portion extending downwardly and orthogonally from the third portion at a proximal end of the third portion;

a front bracing assembly adjustably connected to a first portion of the Z-bracket and configured to brace against a trim lip on a vehicle door at a top of a window well, the front bracing assembly comprising a bracing L bracket, the bracing L-bracket including a generally horizontal first L side including a longitudinally extending first side slot, and a generally vertical second L side including a longitudinally extending second side slot, the bracing L bracket being slidably coupled to the first portion through the first slide slot by way of a first bracing clamp; and a substantially horizontally-extending trim bracket, the trim bracket being slidably coupled to the bracing L bracket through the second slide slot by way of a second bracing clamp, wherein an edge of the trim bracket is configured to brace against the trim lip when installed on the vehicle, wherein the first and second bracing clamps each comprise a bolt with a threaded shaft passing through the respective first and second slide slots and a knob with internal threading receiving an end of the threaded shaft; and a stabilizer assembly, configured to firmly rest against an inside surface of the vehicle door coupled to the fourth portion by way of an extending leg clamp, the extending leg clamp comprising a bolt with a threaded shaft passing through bores in the fourth portion and vertically extending leg and a knob with internal threading receiving an end of the threaded shaft, the stabilizer assembly comprising a generally vertically extending leg adjustably coupled to the Z-bracket, and a generally horizontally extending stabilizer bracing assembly adjustably coupled to the vertically extending leg, the vertically extending leg including an generally vertically extending elongated slot with the horizontally extending stabilizer subassembly being slidably coupled to the vertically extending leg by way of a first stabilizer clamp comprising a bolt with a threaded shaft passing through the slot and a knob with internal threading receiving an end of the threaded shaft, the horizontally extending stabilizer bracing assembly includes (i) an elongated stabilizer member with left and right ends, (ii) a left stabilizer pad extending generally orthogonally outwardly from the elongated stabilizer member proximate the left end, and (iii) a right stabilizer pad extending generally orthogonally outwardly from the elongated stabilizer member proximate the right end.

* * * * *